United States Patent [19]

Mullaney, Jr.

[11] Patent Number: 4,994,181
[45] Date of Patent: Feb. 19, 1991

[54] FRYER OIL FILTERING SYSTEM WITH CLAMPING FRAME AND THRUST APPLYING MEANS

[75] Inventor: Alfred E. Mullaney, Jr., Baltimore, Md.

[73] Assignee: Vulcan-Hart Corporation, Louisville, Ky.

[21] Appl. No.: 402,330

[22] Filed: Sep. 5, 1989

[51] Int. Cl.⁵ .............................................. B01D 35/30
[52] U.S. Cl. ................................... 210/232; 210/233; 210/237; 210/257.1; 210/DIG. 8
[58] Field of Search .............. 210/DIG. 8, 257.1, 232, 210/233, 237, 805, 167

[56] References Cited
U.S. PATENT DOCUMENTS

| | | | |
|---|---|---|---|
| 1,565,661 | 12/1925 | Lomak | 210/DIG. 8 |
| 2,477,404 | 7/1949 | Butt, Jr. | 210/DIG. 8 |
| 3,279,605 | 10/1966 | Shepherd | 210/DIG. 8 |
| 3,337,055 | 8/1967 | Starnes et al. | 210/DIG. 8 |
| 3,356,218 | 12/1967 | Grudoski | 210/DIG. 8 |
| 3,400,824 | 9/1968 | Weimer et al. | 210/DIG. 8 |
| 3,707,907 | 1/1973 | Wilson et al. | 210/DIG. 8 |
| 4,328,097 | 5/1982 | Whaley et al. | 210/DIG. 8 |
| 4,444,095 | 4/1984 | Anetsberger et al. | 210/DIG. 8 |
| 4,517,082 | 5/1985 | Prudhomme | 210/DIG. 8 |
| 4,702,827 | 10/1987 | Wenzel | 210/DIG. 8 |
| 4,805,525 | 2/1989 | Bivens | 210/DIG. 8 |

Primary Examiner—W. Gary Jones
Assistant Examiner—Cynthia L. Nessler
Attorney, Agent, or Firm—Russell L. McIlwain

[57] ABSTRACT

Filtering system which periodically filters cooking oil used in deep fat frying employs a flat, single sheet of filtering material pressed at its outer peripheral edge areas in sealing relationship against the bottom of a vessel having a sump area below the bottom surface. Filtered oil is pumped from the sump area back to the fry tank after filtering. The improvement includes the single sheet and a mechanism for applying downward thrust of the sheet edges against the bottom, such mechanism utilizing fixed ledge means in said vessel to act as an abutment or anchor for the downward thrust-applying elements. A removable filtering screen maintains the sheet above the bottom of the vessel and is preferably removably interconnected with the thrust applying mechanism during installation and removable of filtering sheets in filtering position.

4 Claims, 3 Drawing Sheets

FRYER OIL FILTERING SYSTEM WITH CLAMPING FRAME AND THRUST APPLYING MEANS

This invention relates generally to a system for periodically filtering cooking oil such as is used in deep fat frying of food products, and in particular to a filtering system which may be mobile to the extent that it can be placed within the working space of a fryer for recirculating the oil or fat periodically to maintain it clean of crumbs and other food residue, while also allowing it to be rolled away with a load of hot cooking fat to an oil disposal area. Specifically, this invention relates to the type of filtering sheet employed and the mechanism for placing it in sealing relationship with the vessel in which it performs its filtering function.

BACKGROUND OF THE INVENTION

Filtering systems of the type generally disclosed herein are well-known. A variety of different types of filtering media construction are likewise known. Many such systems have filtering media which are specially constructed in the form of bags by doubling a sheet and sewing the side edges to enable the bag to be slipped over a hollow metallic screen. The open end of the bag is then sealed by a special clamping mechanism around the open end. Quite often, changing of the filtering media is done while the elements are still hot, the vessel having contained cooking oil at a temperature as high as 350° F. The more complex the clamping and bag-retaining mechanism, the greater the difficulty in handling the hot metallic parts and removing a soiled filter for replacement with a new one.

SUMMARY OF THE INVENTION

The present invention contemplates the use of a flat sheet filtering media for use in a vessel for receiving and cleansing cooking oil for return to a fryer tank. The elements for locating the filtering media in filtering position within the vessel are relatively easy to manipulate, allowing for ease of removing the soiled filter and replacing it with a clean sheet. In a preferred form, the filtering media sheet is rectangular in form and has a circular central aperture for locating the sheet on a metallic perforated filter screen. Means is provided for sealing the filtering sheet around the aperture as well as around the peripheral edge area of the rectangular sheet. The latter is accomplished by clamping the periphery of the sheet against the bottom of the vessel. A jack-like nut and screw structure engages ledges near the top edge of the vessel. By turning the nut, pressure is applied at the center of the clamping frame against spring rods, which in turn balance the pressure generally uniformly at the outer edges of the clamping frame to seal the filter sheet to the bottom of the vessel.

In alternate forms of the invention, a rectangular sheet similar to the foregoing is used, but without an aperture or the need to seal around it in the central location. Much of the structure for creating the downward thrust on the clamping frame can be quite similar in structure and function to the preferred embodiment.

OBJECTS OF THE INVENTIONS

A principal object of the invention is to provide a filtering system for cooking oil or fat to enable periodic cleansing of the oil and freeing it of crumbs and other food residue, in which the filtering media comprises a single flat sheet which is inexpensive and simple to produce.

Another object of the invention is to provide a mechanism for clamping a filtering sheet against the bottom of a filtering vessel by utilizing a portion of the vessel itself as a back-up or abutment mechanism for a downwardly-thrusting jack-like clamping structure.

Other objects will be apparent from the following description in which references made to the accompanying drawings.

IN THE DRAWINGS

Figure 6:
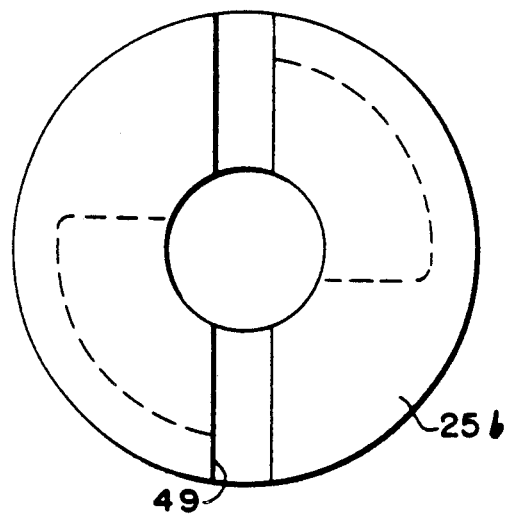
Figure 7:
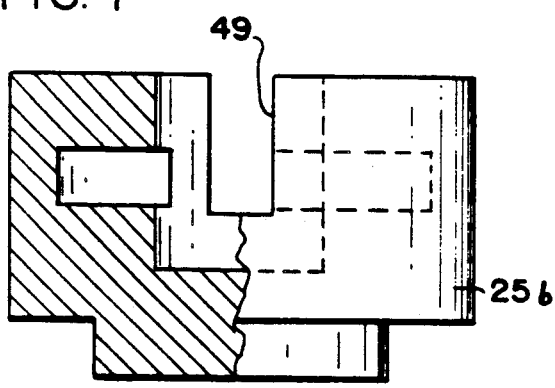
Figure 5:
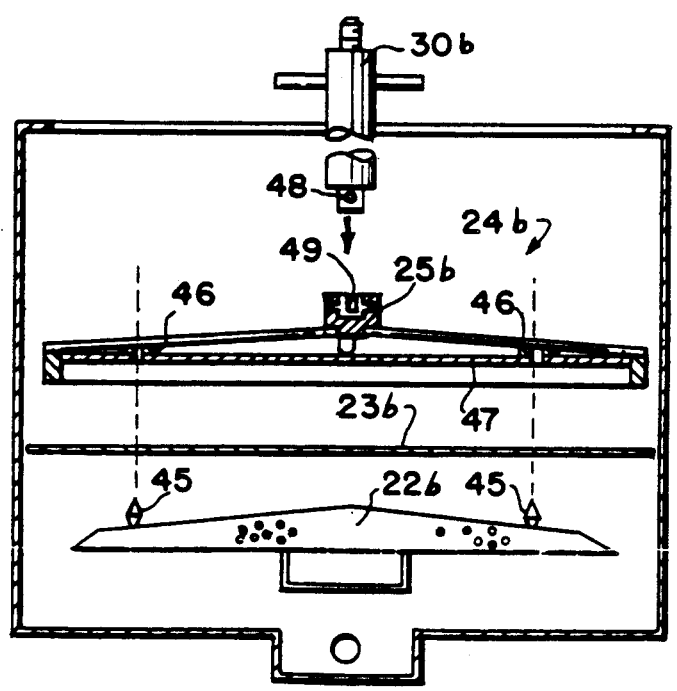

FIGS. 5—7 show a second alternate form of the embodiment which uses a sheet without the central aperture, but which enables the main elements for supporting and clamping a sheet to be removed from and installed in the vessel as a unit.

DESCRIPTION OF THE PREFERRED EMBODIMENT

Figure 1:
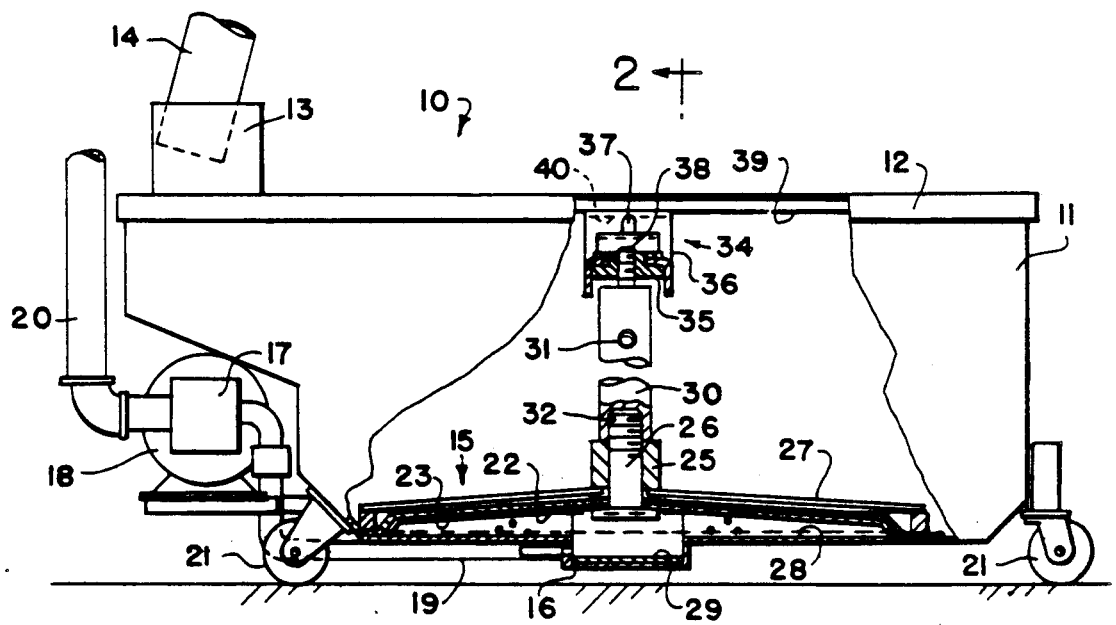
FIG. 1 is a side elevational view of a mobile filtering tank with the filtering elements and media in place within the vessel, showing parts broken away and a portion of the structure being shown in cross section.

FIG. 1 shows a mobile filtering system 10 comprising a vessel 11 in the form of an elongated, generally-rectangular tank having a cover 12. The cover has inlet stack 13 having an upwardly-facing open end. The stack receives an outlet pipe 14 from a fry tank (not shown) used for frying food products in oil at temperatures ranging from 325° F. to 375° F. depending on the type of food product being fried. The outlet pipe is closed during frying, but when the oil or fat needs cleansing, a valve connected to the outlet pipe 14 is opened to dump the used fat through the pipe 14 into the inlet stack 13 to fill the vessel 11. Filtering structure 15 separates the upper portion of the vessel 11 from a sump portion 16 to enable residue to be filtered from the used oil as it passes by suction and gravity into the sump as clean, filtered oil. From there, the oil is withdrawn by a pump 17 driven by a motor 18. The motor is turned on or off in accordance with the requirement to filter, in usual fashion.

The sump 16 and pump 17 are connected by a conduit 19. An outlet pipe 20 from pump 17 returns the filtered oil to the fry tank. Frequently, the clean oil may be recirculated for perhaps five minutes or so, with oil returned to the fryer vat through pipe 20 also being used to flush crumbs from the bottom of the fry tank. The outlet pipe 20 also contains valving means (not shown) to enable the system 10 to be rolled away from the fry tank by means of wheels 21 for disposal of used oil at a location remote from the fryer. As such systems and the fry tank to which the mobile filtering system 10 is connected are old and well-known in the art, they will not be described herein.

Figure 2:
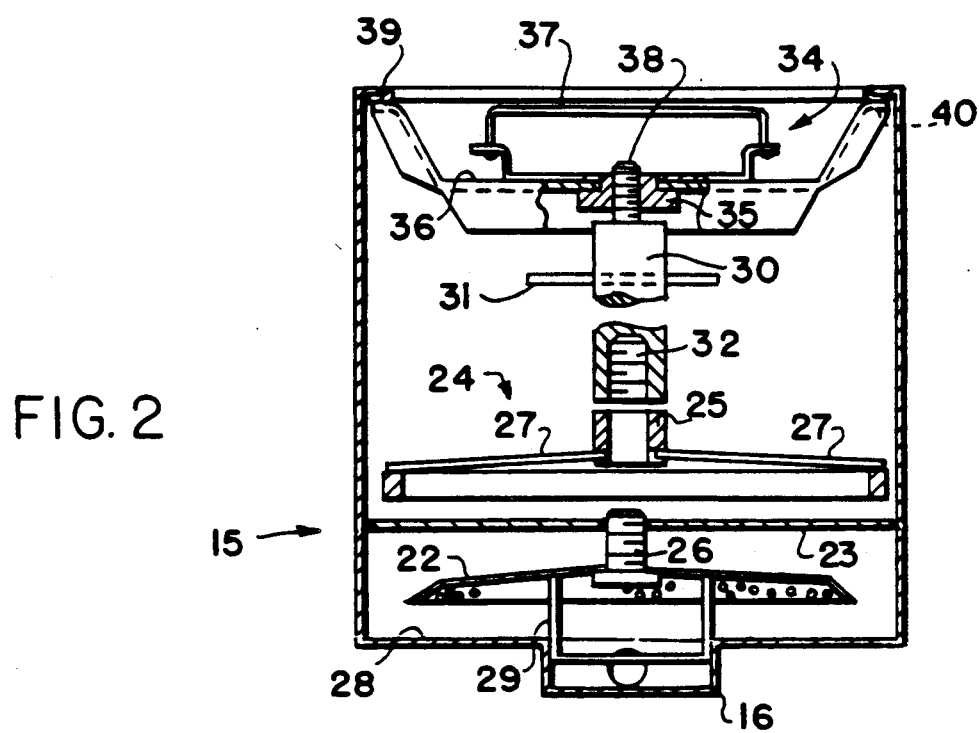
FIG. 2 is an elevational view taken substantially along lines 2—2 of FIG. 1, certain elements of the clamping structure being shown in exploded-view fashion at the lower level of the Figure while the upper portion of the elements is shown in operative, clamping fashion. Non-essential elements, such as wheels and vessel cover are not shown for simplicity.

Cross referring to FIGS. 1 and 2, which essentially show the preferred embodiment of my structure and filtering media at right angles relative to each other, a filtering screen 22 is located at the bottom of the tank. Immediately above the screen 22 is a filtering media sheet 23. A pressure-applying device consisting of a series of bars connected at their ends forms a rectangular clamping frame 24. A threaded stub screw 26 is connected to the filter screen 22. In the version shown, the clamping frame 24 has four pressure rods 27 which distribute a downward force applied through a central hub 25 toward the outer edges of the clamping frame 24 to press the peripheral side edge areas of the filtering sheet 23 against the bottom 28 of the vessel 11.

The filtering screen 22 is designed as a shallow pyramidal, perforated metal sheet against the upper surface of which the filtering sheet 23 lies, so as to space the sheet 23 above the bottom 28 of the vessel 11 to obtain maximum filtering area. A U-shaped member 29 may be fastened to the underside of the filter screen 22 as by spot welding, to place the screen 22 with its edges equidistant and essentially in register with but slightly inwardly of the outer walls of the vessel 11 when the screen 22 is placed in filtering position. FIG. 2 shows the screen 22 partially inserted into the sump 16. In FIG. 1, the member 29 is fully seated into the sump 16 and the lowermost edges of the filter screen 22 are against the bottom 28 of the vessel 11. Also in FIG. 1, the filtering sheet lies atop the filtering screen 22 and its outer edges are clamped by the rectangular clamping frame 24 against the bottom 28 of the vessel 11. It will be seen therefore that the filter screen 22 holds the filtering media sheet 23 off the bottom of the vessel 11 so as to allow maximum space for oil to be filtered through the sheet 23 for entrance into the sump 16 to allow for maximum and fairly rapid passage of cleansed oil through the vessel for return to the fryer vat.

Illustrated best in FIG. 2, the clamping structure 40 which applies the downward thrust to the clamping frame 24 is shown as a vertical central post 30 having a horizontal T-handle 31 passing therethrough. Handle 31 is for rotating the post 30. The post 30 is internally threaded at 32 to mate with the screw 26 extending upwardly from the filter screen 22. In the embodiment of my invention shown in FIGS. 1 and 2, when a filtering sheet 23 is to be replaced, the entire unit is removed from the vessel and placed on a counter or the like. The post 30 is then detached from the screw 26. The sheet can then be gathered to lift the crumbs and other residue for disposal. A new sheet 23 is then placed into position over the screw 26. Next, the clamping frame 24 has its central hub 25 slipped freely over the screw 26 with the outer peripheral side edge areas of the clamping frame 24 engaging the periphery of the new filtering media sheet 23. The aforementioned disassembly and assembly is preferably done as a unit outside the vessel in the embodiment shown in FIGS. 1—3. When lifted out as a unit, the clamping frame 24 and screen 22 support the sheet 23 and crumbs on top thereof, preventing their being dumped during removal. As will be noted hereinafter, the embodiment of FIG. 4 lacks the screw 26. This eliminates the need for an aperture 33 in sheet 23, but prevents installation and removal as a unit. However, the further embodiment of FIGS. 5—7 also eliminates the need for an aperture in the sheet but is installed and removed as a unit.

A jack-like mechanism 34 consisting of a nut 35, a spanner bracket 36 generally in the form of a skirted U-shaped strip and a nut handle 37 are used to apply pressure downwardly through the central post 30 against the clamping frame 24. The upper portion of the post 30 is threaded at 38 to receive the nut 35 of the jack-like mechanism 34. Ledges 39 extend inwardly around the entire top of the vessel 11 as shown in FIG. 2 to strengthen the vessel itself as well as to provide a backstop for allowing the spanner bracket 36 to be placed against the underside of the ledges for application of downward thrust through the central post 30. Nut 35 is journaled in bracket 36.

Assume that the unit is to be used for the first time. Mechanism 34, post 30 and clamping frame 24 are assembled outside the vessel 11, and can be left assembled thereafter, except when disposing of a sheet 23. Filter sheet 23 is placed over screen 22, and by holding screen 22, sheet 23 and clamping frame against relative rotation, post 30 is threaded snuggly onto screw 26 until the area around aperture 33 is sealed to screen 22.

The assembly with its filter in place is then lowered into the vessel cocked at an angle to clear the ledges 39 at the top of the tank. Once the lower end of the assembly is within the vessel, it can be further lowered vertically until member 29 enters sump 16. At the last bit of lowering the spanner bracket 36 must be other than perpendicular to the sides of the vessel 11 so as to have its ends 40 clear the ledges 39. The bracket 36 should then be turned until the ends 40 can be placed beneath the ledge. At that time, the bracket 36 is crosswise of the vessel and is retained in that position while handle 37 is turned to cause nut 35 to rise on threads 38. Once ends 40 engage the ledges 39, further turning of handle 37 jacks the frame 24 downwardly, applying thrust through post 30 and pressure rods 27 to seal the peripheral side edge areas of the sheet 23 against the bottom 28 of the vessel.

In removing the unit for replacement of a filter sheet, the steps are reversed. The periphery of the frame 24 will retain crumbs inwardly. Of course, the screen 22 supports the sheet 23 during removal, also retaining crumbs and other debris on the sheet.

Figure 3:
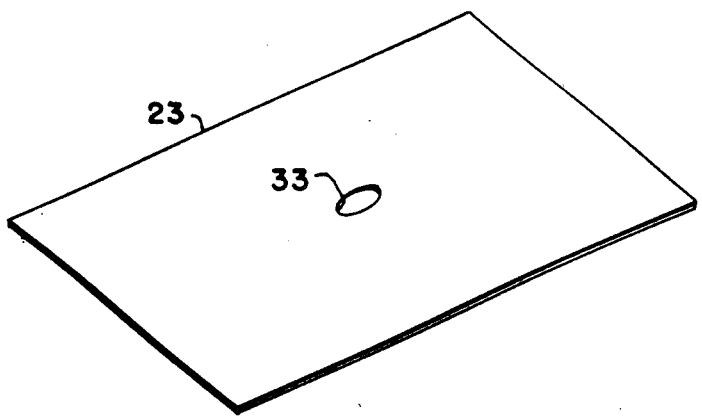
FIG. 3 shows a version of my invention wherein the paper filtering media is rectangular in shape and has a central circular aperture.
Figure 4:
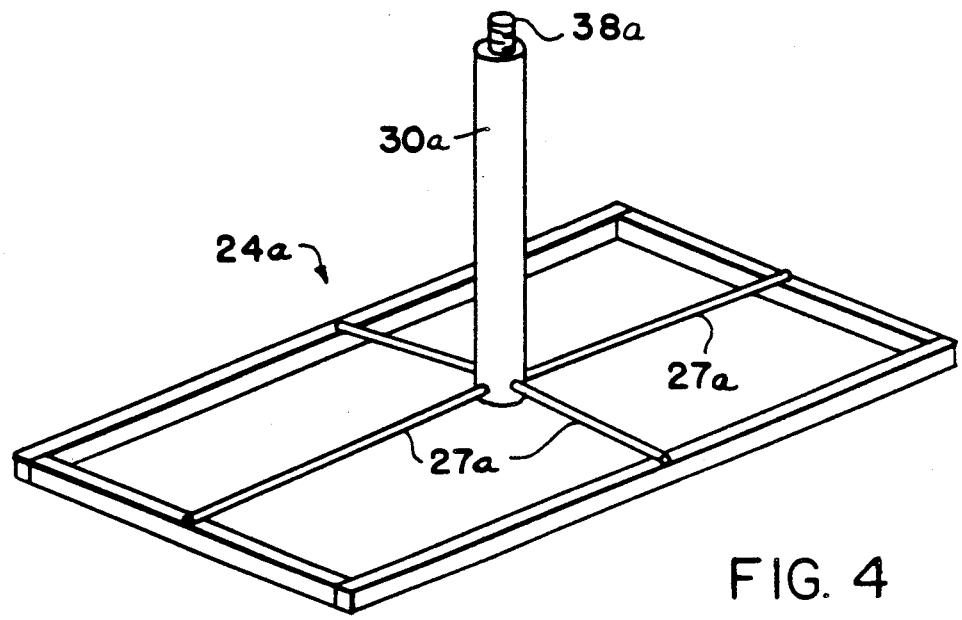
FIG. 4 illustrates a clamping frame of an alternate embodiment of my invention, using a filtering sheet similar to that shown in FIG. 3, but without the central aperture.

FIG. 3 shows the apertured filtering media sheet 23 of the type used with the structure shown in FIGS. 1 and 2. In alternate embodiments of my invention illustrated in FIG. 4 and in FIGS. 5–7, no central aperture 33 needs to be provided. In FIG. 4, I show comparable parts for use within an unapertured filtering sheet 23 with the same numbers, but adding the letter designation "a" to similarly functioning parts. In FIG. 4, all of the elements are preferably welded together as a unitary structure. The bottom of the post 30a, when downward thrust is applied thereto, may contact the top of the unapertured sheet centrally of a filter screen 22a after the rods 27a have been acted upon. The jack-like mechanism can be identical to that illustrated in FIGS. 1 and 2. While this second embodiment allows for a simpler form of filtering media sheet since it is without an aperture, it is not as easy to use. Whereas the entire structure including sheet 23 are removed and installed as a unit in the first embodiment, the FIG. 4 embodiment cannot. Before installing a sheet, the screen, by being independent of the post 30a, is first placed in position in the vessel 11 to receive the sheet. The sheet is then placed over the screen, and the rest of the mechanism operated as before.

Upon removal for changing filters, the clamping frame 24a and rest of the mechanism is first lifted out of the vessel, with the soiled sheet and screen left inside. The sheet would then be gathered at its corners and sides for removal. A new sheet can be placed immediately over the screen and the remaining mechanism applied as previously.

A second alternate embodiment capable of working with an unapertured sheet is shown in FIGS. 5-7. There, filter screen 22b has attached at the top surface thereof four barbs or pins 45 which pass through spring clips 46 carried by clamping frame 24b. A pair of metal straps 47 extend across the clamping frame to support the clips 46.

A filtering sheet 23b is aligned with the screen 22b and pressed downwardly to be pierced by pins 45. The frame 24b is then located over the screen and sheet and pressed down until clips 46 pass over the enlarged center of the pins 45 to make the elements unitary for installation and removal of the sheet 23b.

A hub 25b is adapted to be attached to central post 30b by causing a cross-pin 48 to enter slot 49 of the hub 25b, and upon a quarter-turn of post 30b, lock into the hub. Jack-like mechanism similar to 34 of the FIG. 1 embodiment is connected to the top of post 30b. This embodiment uses a simple, rectangular filtering sheet and can be installed and removed as a unit, to avoid one of the disadvantages of the FIG. 4 embodiment.

Various other design changes can be made in the structure as well as the operation of my system without departing from the spirit and scope of the claims.

Having described my invention, I claim:

1. An oil filtering system for a vessel in which a filtering sheet separates the vessel between an upper used-oil receiving portion and a bottom area including a collecting sump which receives filtered oil by flow through the sheet, said sheet having an outer peripheral edge area, a clamping frame adapted to engage the sheet inwardly of the outer peripheral edge area of the sheet and to apply pressure on the edge area against the vessel bottom, abutment means contacting and extending inwardly of the upper edge of the vessel, and thrust applying means for applying downward thrust between the abutment means and the clamping frame to seal the bottom area from the receiving portion, said thrust applying means comprising a bracket, a rotatable handle and a nut threaded onto a vertical post connected to the clamping frame, whereby rotation of the handle on a vertical axis raises the bracket into engagement with the abutment means and applies downward thrust to the clamping frame such that the sole passage of oil to the sump is through said sheet.

2. The system of claim 1 further including perforate means shaped in plan view like but slightly smaller than the sheet for supporting the sheet spaced above the bottom of the vessel while the sheet extends outwardly beyond the edges of the perforate means.

3. The system of claim 2 including filtering sheet piercing means having a first portion supported on said clamping frame and a second portion engagable with said first portion for connecting said perforate means and clamping frame together with the filtering sheet supported therebetween, whereby the perforate means, frame and sheet can be installed in or removed from said vessel as a unit.

4. The system of claim 2 including a hub located centrally of said clamping frame, a plurality of spring rods extruding generally radially between the outer edges of the clamping frame and the hub, and a vertical post removably attachable to said hub for lifting at least said clamping frame from said vessel when replacing a filtering sheet.

* * * * *